United States Patent [19]

Bubel et al.

[11] Patent Number: 5,770,131
[45] Date of Patent: Jun. 23, 1998

[54] METHOD AND APPARATUS FOR APPLYING AN OSCILLATING FORCE ON A MOLTEN MATERIAL

[75] Inventors: Alexander Bubel, Stamford; Robert Callahan, Hamden; Akihisa Kikuchi, Stamford, all of Conn.

[73] Assignee: Thermold Partners, L.P., Stamford, Conn.

[21] Appl. No.: 581,976

[22] Filed: Jan. 2, 1996

[51] Int. Cl.$^6$ ....................................................... B29C 45/77
[52] U.S. Cl. ................................ 264/69; 264/70; 425/145
[58] Field of Search ......................... 264/69, 70; 425/145

[56] References Cited

U.S. PATENT DOCUMENTS

| | | |
|---|---|---|
| 3,523,147 | 8/1970 | Hold et al. . |
| 4,029,454 | 6/1977 | Monnet . |
| 4,120,922 | 10/1978 | Lemelson . |
| 4,288,398 | 9/1981 | Lemelson . |
| 4,469,649 | 9/1984 | Ibar . |

(List continued on next page.)

FOREIGN PATENT DOCUMENTS

| | | |
|---|---|---|
| 11 40 340 | 11/1962 | Germany . |
| 26 14 819 | 7/1974 | Germany . |
| 25 13 594 | 10/1976 | Germany . |
| 26 14 213 | 10/1977 | Germany . |
| 0152307 | 11/1981 | Germany . |
| 2-26722 | 1/1990 | Japan . |
| WO 92/13701A1 | 8/1992 | Japan . |
| 1 173 509 | 12/1969 | United Kingdom . |
| 1 220 707 | 1/1977 | United Kingdom . |
| 2 008 023 | 5/1979 | United Kingdom . |
| 1 533 924 | 10/1979 | United Kingdom . |
| 2 170 142 | 7/1986 | United Kingdom . |

OTHER PUBLICATIONS

The Effect of Oscillating Packing Pressures on the Residual Stresses in Thick–Section Polyethylene Injection Mouldings, Plastics and Rubber Processing and Applications, vol. 5, No. 1 (1985) pp. 71–78 by P.S. Allan and M.J. Mortazavi.

Multiple live–feed processing as a route for fibre management in composite materials, International Conference on New Materials and their Applications, University of Warwick 1990, pp. 13–23 by P.S. Allan and M.J. Bevis.

(List continued on next page.)

*Primary Examiner*—Tim Heitbrink
*Attorney, Agent, or Firm*—Seidel, Gonda, Lavorgna & Monaco, PC

[57] ABSTRACT

A process and apparatus for applying an oscillating force to a molten material. The apparatus includes a barrel in communication with a hopper for receiving a flow of moldable material. A screw conveyor is rotatable and axially reciprocatable within the barrel. At least one conveyor flight is formed on the screw conveyor for conveying and compressing the moldable material. Rotation and reciprocation of the screw conveyor forces the material to flow out of the barrel and along a conduit in a mold assembly. The conduit communicates with a mold cavity. A controller controls the rotation and reciprocation of the screw conveyor. The controller reciprocates the screw conveyor toward and away from the mold during filling of the mold cavity inducing a shearing of the material. Each reciprocation of the screw conveyor translates the screw conveyor closer toward the mold cavity. A method is also disclosed which includes dispensing a moldable material into an barrel. Rotating a screw conveyor about its longitudinal axis for conveying the moldable material. Accumulating a predetermined amount of material. Translating the screw conveyor along its longitudinal axis toward a mold to a first location, thereby forcing a portion of the accumulated material to flow into a mold cavity. Translating the screw conveyor away from the mold. Then translating the screw conveyor again toward the mold to a second location, thereby forcing additional accumulated material to flow into the mold cavity, the second location being closer to the mold than the first location.

33 Claims, 6 Drawing Sheets

U.S. PATENT DOCUMENTS

| | | |
|---|---|---|
| 4,542,054 | 9/1985 | Fillmann . |
| 4,579,515 | 4/1986 | Kawaguchi et al. .................... 425/136 |
| 4,919,870 | 4/1990 | Ibar . |
| 4,925,161 | 5/1990 | Allan et al. . |
| 4,994,220 | 2/1991 | Gutjahr et al. . |
| 5,059,368 | 10/1991 | Allan et al. . |
| 5,069,840 | 12/1991 | Arnott . |
| 5,074,772 | 12/1991 | Gutjahr . |
| 5,132,549 | 7/1992 | Allan et al. . |
| 5,156,858 | 10/1992 | Allan et al. . |
| 5,160,466 | 11/1992 | Allan et al. . |
| 5,192,555 | 3/1993 | Arnott . |
| 5,254,298 | 10/1993 | Ibar . |
| 5,306,129 | 4/1994 | Ibar . |
| 5,421,712 | 6/1995 | Laing et al. ............................ 425/145 |

OTHER PUBLICATIONS

The Production of void–free thick–section injection–flow mouldings. 2. Preferered orientation and residual stress measurements, Plastics and Rubber Processing Applications vol. 3, (1983) pp. 331–336, by P. Allan and M. Bevis.

Rheomolding: A New Process To Mold Polymeric Materials, Polym.–Plast. Technol. Eng., 17(1), pp. 11–44 (1981), by J.P. Ibar.

Producing void–free thick–section thermoplastic and fibre reinforced thermoplastic mouldings, Plastics and Rubber International, Apr. 1984, vol. 9, No. 2, pp. 33–37 by P. Allan and M. Bevis.

Instability in the rubbery state revealed by d.s.c. of Rheo-molded® polysytrene samples, Polymer Communicatons, 1983, vol. 24, Nov., pp. 331–335, by J.P. Ibar.

Increasing Weld–Line Strength Through Dynamic Control Of Volumetric Shrinkage, ANTEC '94, pp. 631–636 by David O. Kazmer and David S. Roe.

The Production of Void–Free Thick–Section Injection–Flow Mouldings. I. Shot–Weight and Dimensional Reproducibility, Plastics and Rubber Processing Applications vol. 3 (1983) pp. 85–91, by Allan and Bevis.

WPI Abstract Accession No. 90–072396/10 & JP2026722 (Toyo Kikai Klinzoku KK) Jan. 29, 1990.

WPI Abstract Accession No. 82–35304E/18 & DD152307 (G Richter) Nov. 25, 1981.

METHOD AND APPARATUS FOR APPLYING AN OSCILLATING FORCE ON A MOLTEN MATERIAL

FIELD OF THE INVENTION

The present invention relates to an apparatus and method for molding moldable material using oscillatory/vibratory motion. More particularly, the apparatus and method utilize an oscillating injection unit for creating and applying compressive and shear loads to a moldable material flow.

BACKGROUND OF THE INVENTION

Conventional processing of moldable materials involves transforming a starting material in a solid or a liquid state, which is in a fungible form (e.g., powder, beads, granules, pellets, paste, etc.), into a fmal or intermediate product having a specific shape, dimensions and properties. A variety of processes exist for performing the transformation of moldable materials from their initial fungible form to the form of the fmal or intermediate product. For instance, if the moldable material is a plastic, examples of plastic transformation processes include extrusion, transfer molding, calendering, laminating, thermoforming, injection molding, compression molding, blow molding, and the like. As used herein, such transformation processes and/or operations are collectively referred to as "molding" processes. Similarly, the resulting fmal or intermediate product is referred to as "molded," regardless of the specific transformation process employed in its manufacture.

A typical molding system includes a hopper for providing the initial fungible material, a screw conveyor for compressing, melting, conveying and injecting the material, and a mold for defining the shape of the final molded part. The mold may, for example, be a blow mold, an injection mold, or an extrusion mold die. The primary objective of a mold or die is to shape moldable material introduced therein by confining the material to a preselected shape and retaining the material in that confined state until it solidifies.

In an injection molding process, a reciprocating or two-stage injection screw is typically utilized. Referring to FIGS. 1A and 1B, a reciprocating screw has two separate functions. In the first stage of injection (FIG. 1A), the screw rotates about its longitudinal axis, producing rotation of one or more screw flights. Rotation of the flights causes the material to move forward along the heated barrel where it is compressed and melted until fully plasticized. The screw flights convey the material from the hopper to an accumulation chamber. As the molten material accumulates in the accumulation chamber, it displaces the injection screw axially along its longitudinal axis away from the mold. After a predetermined amount of material is located in the accumulation chamber ("a shot"), rotation of the screw is stopped completing the first stage. A shot is typically defined as the amount of material required to fill the mold, the runners and the sprue. In the second stage of injection, the screw is operated in a manner similar to a plunger. That is, the screw is driven axially forward along its longitudinal axis, injecting the shot along a sprue or conduit and into a mold cavity, as shown in FIG. 1B. The screw is then held in that position to maintain pressure on the material in the mold cavity. This permits the plastic in the mold to solidify. After solidifying, the mold is opened and the molded part is ejected.

Some problems that result with conventional injection molding processes are the development of voids, weld (knit) lines, and non-uniform surface finish in the final product. Voids in molded products are the result of air trapped within the material during solidification. Venting of the mold cavity assists in removing the air from the cavity. However, the material flow within the mold cavity and the short solidification time may prevent all the air from completely escaping. Weld or knit lines in molded products are the result of the joining of melt fronts. This is primarily a concern where multiple flow paths exist within the mold. When the melt fronts meet within the mold cavity, air can become trapped between them during solidification, and venting can assist in removing any entrapped air. Additionally, the lack of control over the material flow during the molding process results in the development of residual stresses in the fmal product.

The physical properties of a molded product depend, in part, upon the specific molding process conditions and steps employed. It has been observed that different molding processes will often result in the fmal or intermediate products having different physical properties. For example, the rate of cooling and the amount of shear stress applied to the material during molding determines, in part, the degree of molecular orientation and crystallization (in crystallizable materials) within the molded product. This, in turn, has an effect on the molded product's physical properties.

One method of controlling the amount of shear stress applied during molding of a molded product (and thereby controlling some of the product's physical properties) is commonly referred to as "flow technology." The concept of "flow technology," as it relates to plastic molding processes, is concerned with the behavior of a moldable plastic material before, while, and after it is introduced into a mold and/or passed through a die. It has been discovered that the properties of a final or intermediate molded product depend largely upon how the moldable material flows prior to and/or while being subjected to a molding process. For example, two products having identical dimensions and made from the same basic starting material, but which are molded under different conditions (e.g., different hydrostatic pressures and/or shear stresses) and subjected to different flow patterns, will have different physical properties.

This phenomenon occurs, in part, because, as a moldable material flows prior to or while entering a mold or passing through a die, it is subjected to a shear stress, commonly referred to as "flow shear stress." Flow shear stress induces molecular orientation in the plastic material (i.e., it results in the macromolecules in the material aligning themselves in the direction of flow). The flow shear stress varies from a maximum level at the outside surface of the flowing moldable material to a minimum level at the center, where the material is slowest to cool and has the lowest frictional effects caused by the mold wall during material flow.

One prior art system for applying a flow shear stress to a moldable material using an additional component mounted between the nozzle on the screw and the sprue in the mold. This additional component includes one or more pistons mounted so as to be in communication with the flow of the material. Reciprocation of the pistons induces shear in the moldable material within the mold. An example of this type of prior art system is shown in U.S. Pat. No. 5,160,466.

The primary deficiency with this prior art system for inducing shear is the requirement for the additional component between the screw and the mold. This additional component occupies considerable space and is expensive to install which results in an overall increase in the cost of the fmal product.

A need therefore exists for an apparatus and method which is readily adaptable to existing molding machines and which facilitates the application of a flow shear stress to a moldable material prior to, during and/or after filling of an injection mold.

SUMMARY OF THE INVENTION

An injection molding apparatus for applying an oscillating force to a molten material. The apparatus includes a hopper for storing and dispensing moldable material. A barrel is in communication with the hopper and receives a flow of moldable material. A screw conveyor is rotatably mounted within the barrel. The screw conveyor is also axially reciprocatable within the barrel and has at least one conveyor flight formed on it for conveying and compressing the moldable material. A nozzle is formed on the barrel at a location downstream from the screw conveyor and has a passageway formed through it which permits flow of material out of the barrel. The reciprocation of the screw conveyor forces the material to flow through the passageway.

A mold assembly, with at least one conduit or sprue, is in communication with the passageway in the nozzle. The conduit is also in communication with a mold cavity which defines the shape of the final product.

The injection apparatus also includes a controller which controls the rotation and reciprocation of the screw conveyor within the barrel. The controller rotates the screw conveyor to convey the material toward the mold cavity. The controller translates the screw conveyor along its longitudinal axis toward the mold cavity to force the material to flow out of the barrel and into the mold cavity. The controller reciprocates the screw conveyor toward and away from the mold during filling so as to induce a shearing of the material. Each reciprocation of the screw conveyor translates the conveyor closer toward the mold cavity.

In one embodiment of the invention, the injection molding apparatus includes a plurality of valves and a plurality of conduits into the mold cavity which are spaced from one another. One valve is positioned between each conduit and the nozzle. Each valve is actuatable between an open position for permitting flow of the moldable material along its associated conduit and a closed position inhibiting flow of the moldable material along its associated conduit. The controller controls actuation of the multiple valves so as to place at least one valve in its open position and place at least one other valve in its closed position while the screw conveyor is being reciprocated.

A method is also disclosed for applying an oscillating force on a molten material within a mold cavity. The steps of the method include dispensing a moldable material into an barrel. Rotating a screw conveyor about its longitudinal axis for conveying the moldable material to an accumulation chamber. Accumulating a predetermined amount of material within the accumulation chamber. Translating the screw conveyor along its longitudinal axis and toward a mold a first predetermined distance so as to force a portion of the accumulated material to flow along a conduit and into a mold cavity. Translating the screw conveyor along its longitudinal axis away from the mold. The screw conveyor is then translated along its longitudinal axis and toward the mold a second predetermined distance forcing accumulated material to flow along the conduit and into the mold cavity. The predetermined distances are selected so as to move the conveyor closer toward the mold with each oscillation.

In one embodiment, the method for applying an oscillating force on a molten material includes the additional steps of actuating a first flow control valve between an open and closed position, the first flow control valve controlling flow of the molten material along a first conduit in communication with the mold cavity. Then actuating a second flow control valve between an open and closed position, the second flow control valve controlling flow of the molten material along a second conduit in communication with the mold cavity. The actuation of the flow control valves is performed between axial translations of the screw conveyor and is controlled by a controller. The actuation of the flow control valves and the translations of the screw conveyor producing a flowing of the material in a prescribed direction within the mold cavity.

The foregoing and other features and advantages of the present invention will become more apparent in light of the following detailed description of the preferred embodiments thereof, as illustrated in the accompanying figures.

BRIEF DESCRIPTION OF THE DRAWINGS

For the purpose of illustrating the invention, the drawings show a form of the invention which is presently preferred. However, it should be understood that this invention is not limited to the precise arrangements and instrumentalities shown in the drawings.

DETAILED DESCRIPTION OF THE PREFERRED EMBODIMENTS

Figure 2:
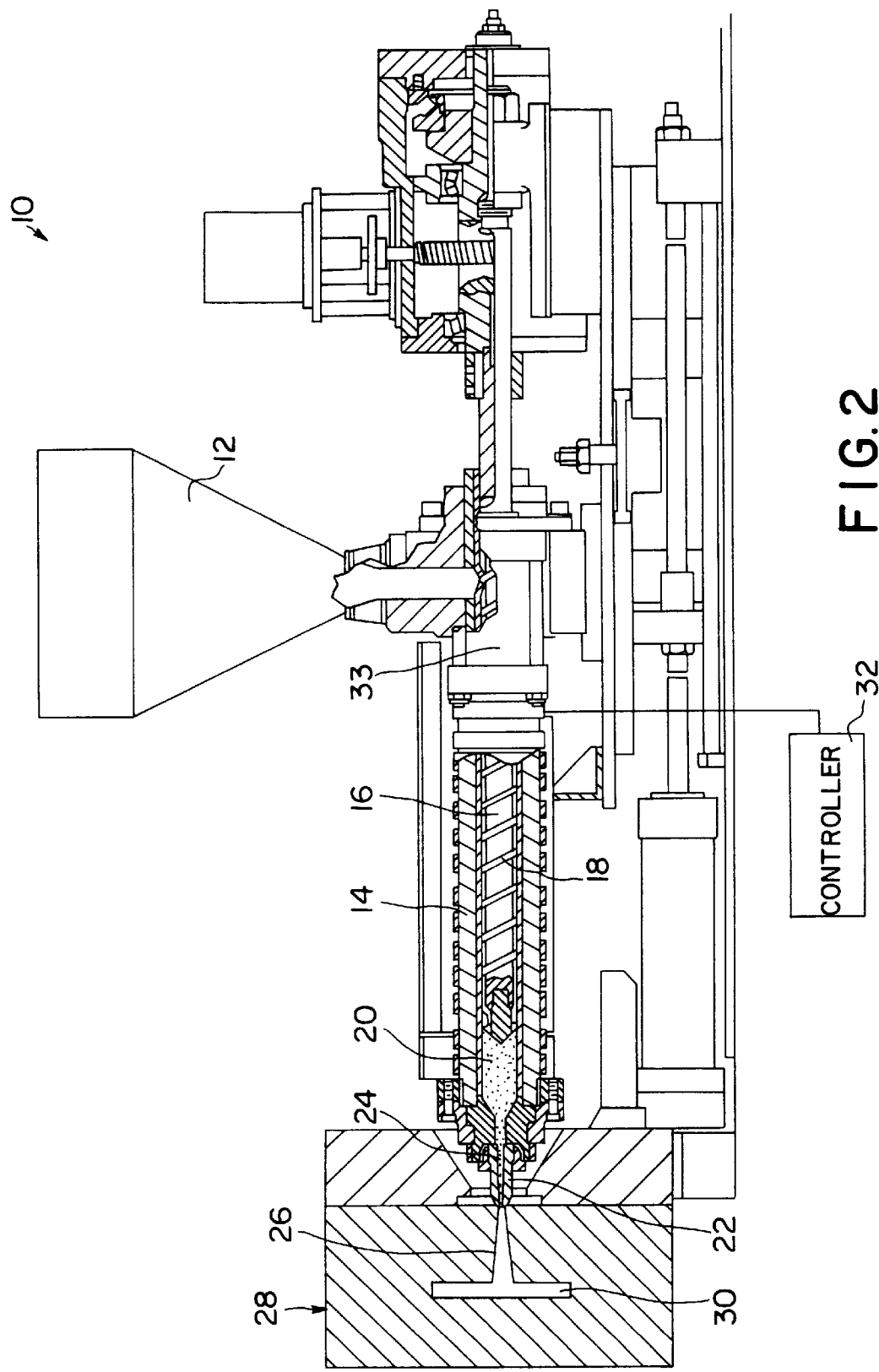
FIG. 2 illustrates an injection molding apparatus according to the present invention.

Referring now to the drawings, wherein like reference numerals illustrate corresponding or similar elements throughout the several views, FIG. 2 illustrates the present invention as it is incorporated in an injection molding assembly 10. The assembly 10 includes a hopper or feeder 12 which contains one or more material components in their initial fungible state. The hopper 12 feeds the material into a screw barrel 14. A screw conveyor 16 is rotatably mounted within the barrel 14 and has at least one conveyor flight 18 formed on it. The screw conveyor 16 is also capable of axial reciprocation within the barrel 14 along its longitudinal axis. The hopper 12, barrel 14, and screw conveyor 16 are conventional in the art and function, in combination, to compress, melt, and convey the material to an accumulation chamber 20.

Downstream from the accumulation chamber 20 is a nozzle 22, which has a passageway 24 formed therethrough. The passageway 24 is in fluid communication with the accumulation chamber 20. As will be discussed in more detail below, melted material is forced to flow from the accumulation chamber 20 through the passageway 24 and into a conduit or sprue 26 of a mold 28. The conduit or sprue 26 is in fluid communication with a mold cavity 30. For the sake of simplicity, the sprue 26 will be referred to as a conduit. However, it should be understood that the term conduit is intended to cover a sprue or sunilar channel into the mold cavity. The mold cavity 30 is typically configured in the desired shape of the final article. The flow of melted material is forced along the conduit 26 and into the mold cavity 30, where it is allowed to solidify into the final product.

Figure 1:
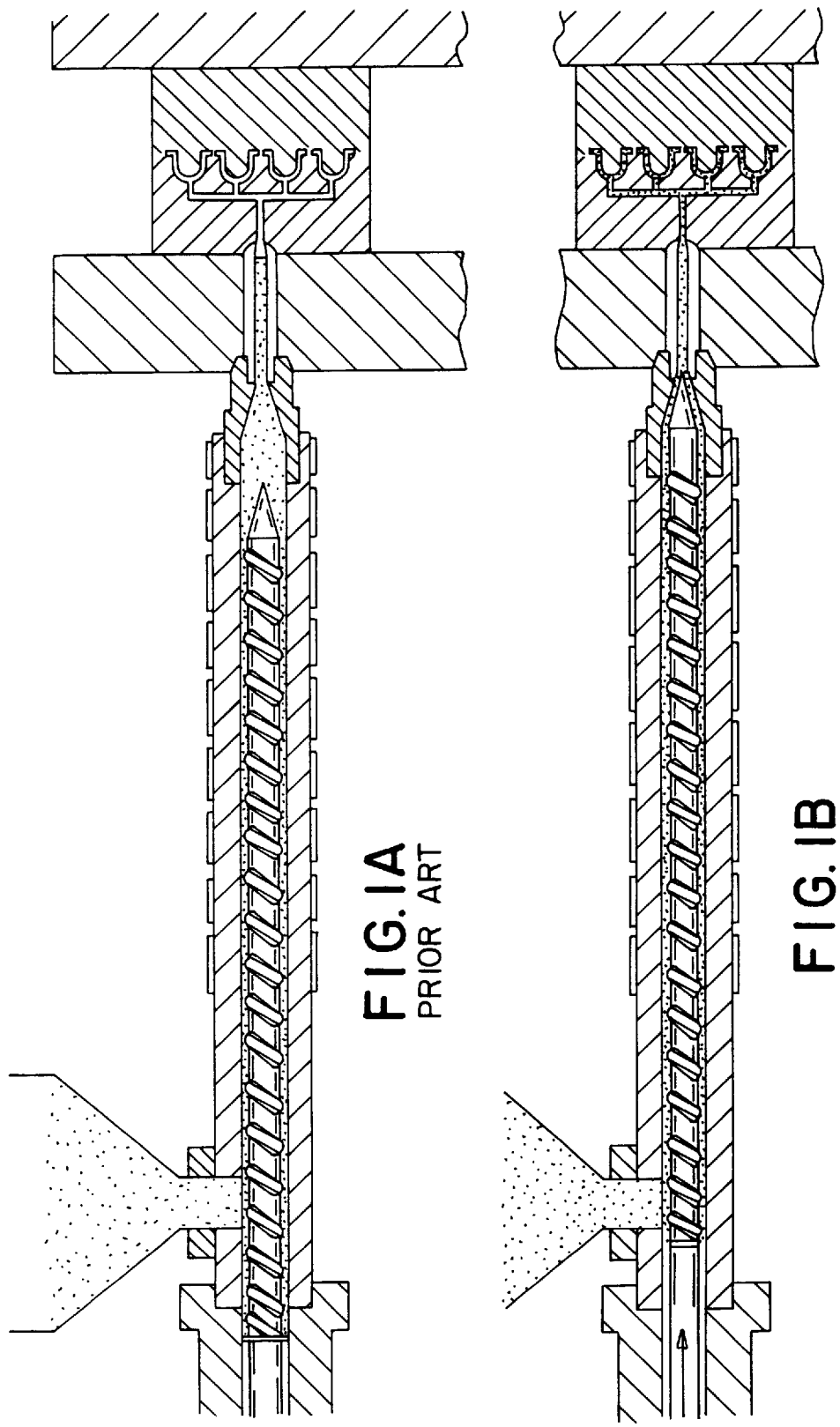
FIGS. 1A–1B illustrate convention two-stage injection screw.

A controller 32 controls the axial reciprocation of the screw conveyor 16. As discussed above, prior art devices axially translate the screw conveyor 16 after a shot of material sufficient to completely fill the mold cavity 30 has been accumulated within the accumulation chamber 20 (FIGS. 1A and 1B). Specifically, the controller 32 controls the actuation of the hydraulic injection cylinders 33 which cause the screw conveyor 16 to move axially along its longitudinal axis. It is also known to continuously reciprocate the screw conveyor 16 along its longitudinal axis after the shot of material has been injected into and fills the mold cavity 30. The reciprocation of the screw conveyor 16 after the mold cavity 30 is filled prevents the conduit from freezing while additional material is packed into the mold cavity. The packing of the material in the mold cavity prevents micro-voids, micro-cracks and/or sinks from developing when the material shrinks during solidification.

In the present invention, the controller 32 also reciprocates the screw conveyor 16 during injection or filling of the mold cavity 30. The reciprocation of the screw conveyor 16 during filling provides several benefits. First, the reciprocation during filling produces additional mixing of the melted material. The unmelted material within the hopper 12 may comprise two or more component parts (e.g., polystyrene pellets and coloring pellets). The component parts are usually mixed within the hopper 12 and/or while the material is being conveyed by the screw conveyor 16. This mixing, however, may not be sufficient to provide structurally or aesthetically acceptable final parts. The present invention solves this problem by reciprocating the screw conveyor 16 while the material is flowing into the mold cavity 30 and, thereby, causes the melted material to mix further.

Figure 3C:
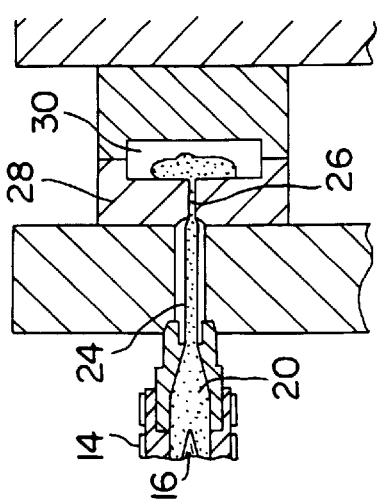
FIGS. 3A–3F illustrate various stages of a screw conveyor according to the present invention.
Figure 3F:
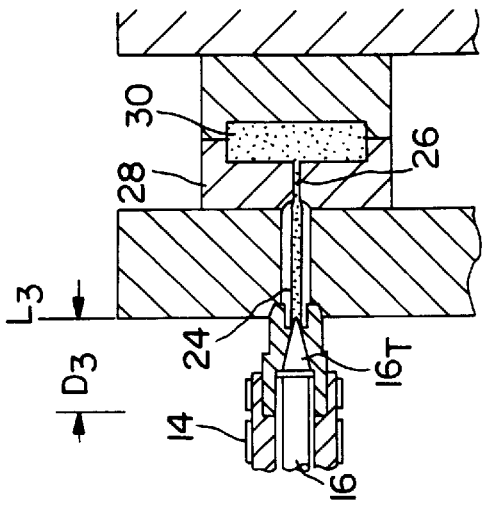
Figure 3B:
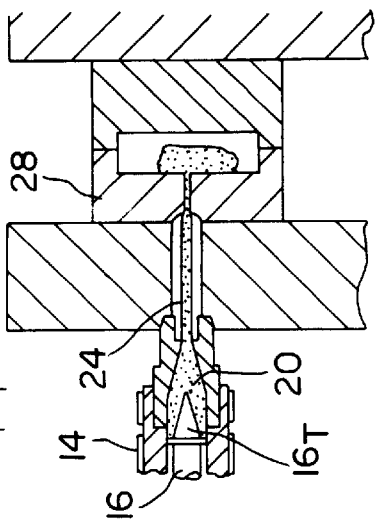
Figure 3E:
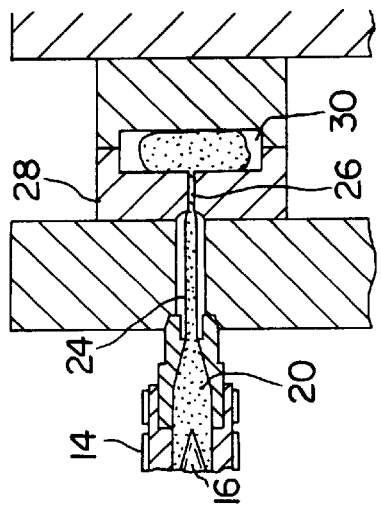
Figure 3A:
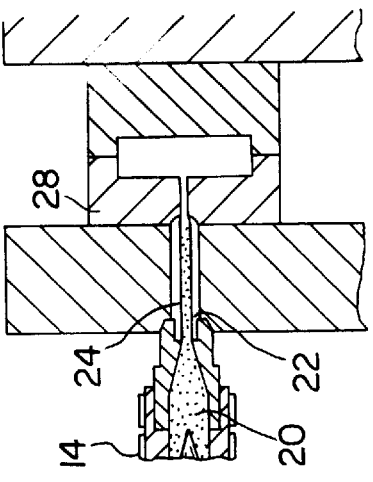

Referring to FIGS. 3A through 3F, the multiple stages or steps of the screw conveyor oscillation are shown according to the present invention. FIG. 3A shows a first stage of injection wherein the material is fed from the hopper 12 into the barrel 14 where it is compressed, melted, and conveyed to the accumulation chamber 20 by the screw conveyor 16. When a predetermined amount of material has accumulated within the accumulation chamber 20, the screw conveyor 16 is moved axially along its longitudinal axis toward the mold 28 a first predetermined distance, $D_1$, to a first location, $L_1$ (FIG. 3B). This causes a portion of the melted material to flow though passageway 24 along the conduit 26 and into and within the mold cavity 30. The screw conveyor 16 is then moved axially away from the mold 28 (FIG. 3C). This causes relaxation of the material within the conduit 26 and mold cavity 30 and may cause some of the material within the mold cavity 30 to flow back out along the conduit 26 and through the passageway 24. The screw conveyor 16 is then again translated axially toward the mold 28 a second predetermined distance, $D_2$, to a second location, $L_2$. The second predetermined distance $D_2$ is preferably greater than the first predetermined distance, $D_1$ (FIG. 3D) such that the second location, $L_2$, is axially closer to the mold than the first location, $L_1$, (i.e., $L_2 < > L_1$). This forces an additional portion of the material within the accumulation chamber 20 to flow through the conduit 26 and into the mold cavity 30.

The above steps or stages can be repeated (FIGS. 3E and 3F) until a sufficient amount of material is within the mold cavity 30 to form a final part. In each repeated step, the screw conveyor 16 is translated an additional predetermined distance ($D_3$, $D_4$, . . . $D_N$), with each subsequent predetermined distance preferably being greater than the preceding predetermined distance (i.e., $D_N > D_{N-1}$). This results in the screw conveyor advancing to locations ($L_3$, $L_4$, . . . $L_N$) which are spaced apart from one another with each subsequent location preferably being axially closer to the mold than the previous location (i.e., $L_N < > L_{N-1}$). The oscillation can be continued after the mold cavity 30 is filled to provide compression/relaxation of the material within the mold 28.

Figure 4:
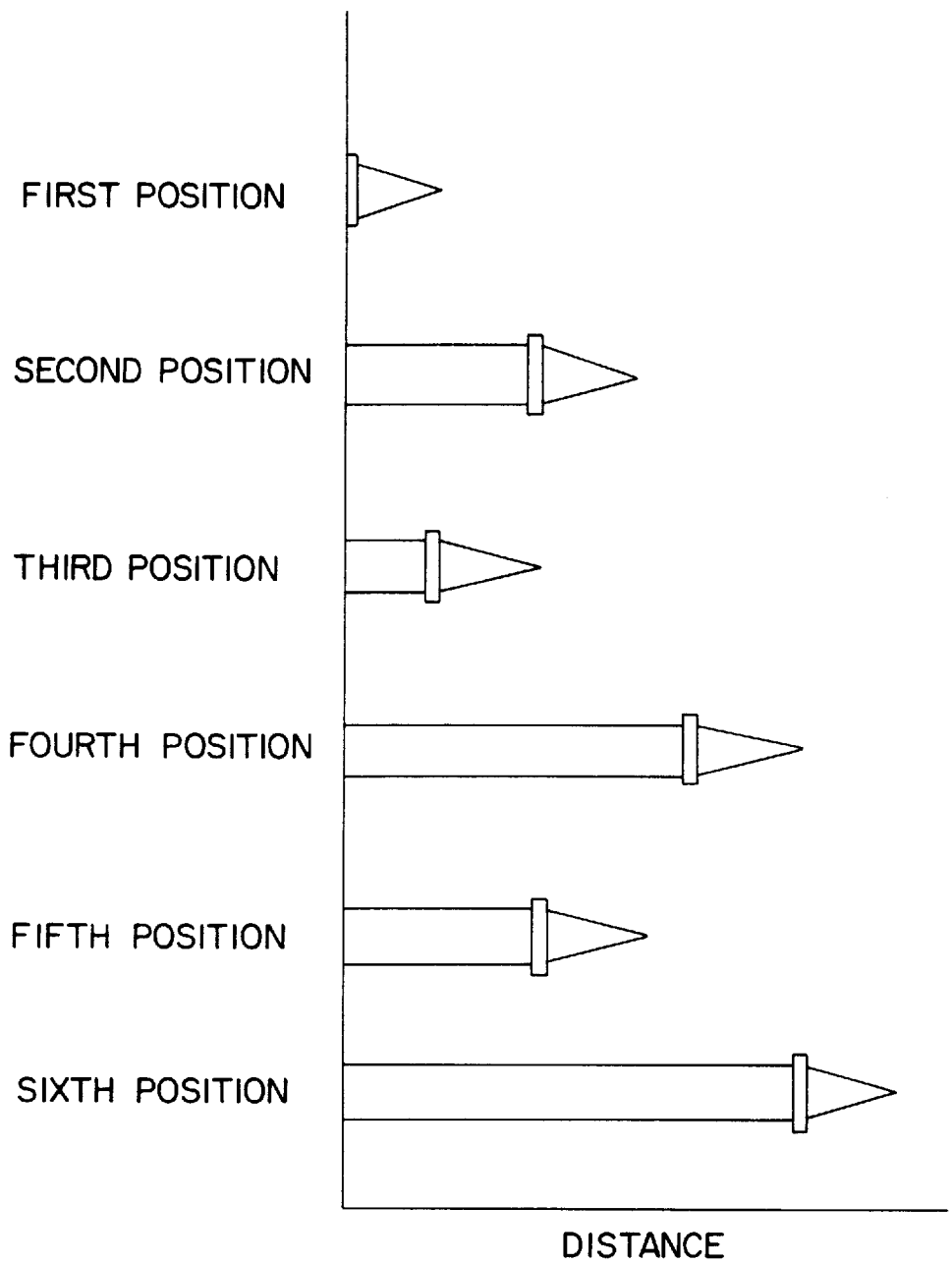
FIG. 4 is a graphical illustration of the position of the screw conveyor tip according to one embodiment of the invention.

It is also contemplated that the predetermined distances toward the mold may be constant (i.e., $D_N = D_{N-1}$) while the return distances (i.e., the distances the screw conveyor 16 is moved away from the mold) may vary with respect to each other or with respect to the distances toward the mold. For example, if the screw conveyor 16 is translated toward the mold 0.5 inches, translated away from the mold 0.25 inches, and then translated toward the mold 0.5 inches. The overall result is the axial movement of the screw conveyor 16 toward the mold with each reciprocation (i.e., $L_N < > L_{N-1}$). This causes the material within the mold 28 to flow into and within the mold cavity 30. FIG. 4 is a diagrammatical illustration of the translational movement of the screw conveyor 16 when operated as described in this embodiment.

As stated above, the oscillation or reciprocation of the screw conveyor 16 produces additional mixing of the melted material in the accumulation chamber 20 and in the mold cavity 30. Accordingly, the present invention provides a novel system for mixing the melted material during the filling of a mold cavity 30.

Figure 3D:
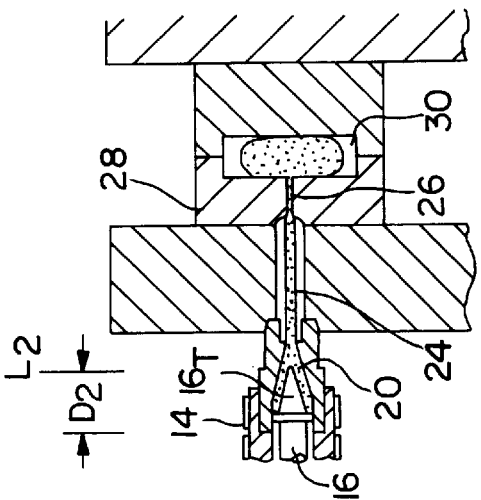

Another benefit provided by the reciprocation of the screw conveyor 16 is the ability of influence the rheological properties of the final molded product. As described in detail in U.S. Pat. Nos. 4,469,649 and 5,306,129, which are both incorporated herein by reference, application of a vibratory or oscillatory force to a melted material prior to and during solidification can transform the resulting physical properties of the final product. For example, by subjecting a melted material to vibration or oscillation, it is possible to alter the orientation of the macromolecules which affects the physical properties of the material. It is contemplated that the controller 32 can be utilized to control the reciprocation of the screw conveyor 16 so as to result in a product with the desired physical properties. For example, one way to affect the Theological or physicochemical properties of a melt is by controlling the shearing of the material. The present invention accomplishes this in a novel way. During the initial phase of reciprocation of the screw conveyor 16 (which is shown in FIGS. 3A–3C), a shearing of the melt occurs within the accumulation chamber 20. This is the result of a screw tip $16_T$ on the screw conveyor 16 moving in relation to the barrel 14. At this point in the injection process, there is only minimal amount of shearing being applied to the melted material within the mold. Referring now to FIGS. 3D–3F, after enough material has been injected into the mold cavity 30 so contact the mold cavity walls, compression/relaxation of the material within the mold will occur with each additional reciprocation of the screw conveyor 16. This results in shearing of the material within the mold cavity 30. The amount of material needed within the mold cavity 30 to produce shearing will, of course, depend on the mold geometry. By controlling the shearing of the material both before and after entering the mold, it is possible to alter the physicochemical properties of the resulting product (e.g., macromolecular orientation). Those skilled in the art would readily be capable of utilizing the teaching of the present invention for altering the physical properties of the moldable material and, therefore, no further discussion is needed.

It is also well known that, during the flow process, molten polymers store a significant amount of elastic energy when subjected to pressure, such as from a screw of an injector. This stored elastic energy in the polymer melt could cause a high level of residual stress, die swell and/or melt fracture in the final molded article. Reciprocation of the screw conveyor 16 on the molten polymer prior to and/or during solidification or curing can be used to control the level of elastic "memory" by allowing concurrent relaxation of the polymer molecules. This results in the reduction of the residual stress and/or elimination of the melt fracture in the final molded part. Prior art methods of reducing the residual stress or melt fracture stress include reducing the applied pressure, increasing molding cycle time, annealing the molded article after it is already molded, etc. The present invention eliminates or reduces the need for such expensive and time-consuming manufacturing solutions.

As discussed above, the controller 32 controls the reciprocation of the screw conveyor. In order to provide accurate control, the controller 32 may receive signals from one or more sensors on the molding assembly 10 which are indicative of the current status of the material flow. For example, a sensor on the hydraulic cylinder 33 and/or barrel 14 may send a signal to the controller 32 which is indicative of the position of the screw conveyor 16. Alternately, time or velocity signals can be provided to the controller 32. The controller 32 can utilize these signals to determine the position of the screw conveyor 16. Based on this determination, the controller 32 can accurately control the rotation and reciprocation of the screw conveyor 16 so as to produce the desired pressure profile in the mold cavity and the desired properties in the final product. The controller 32 can also vary the frequency of reciprocation to further control the resulting material properties.

Figure 6:
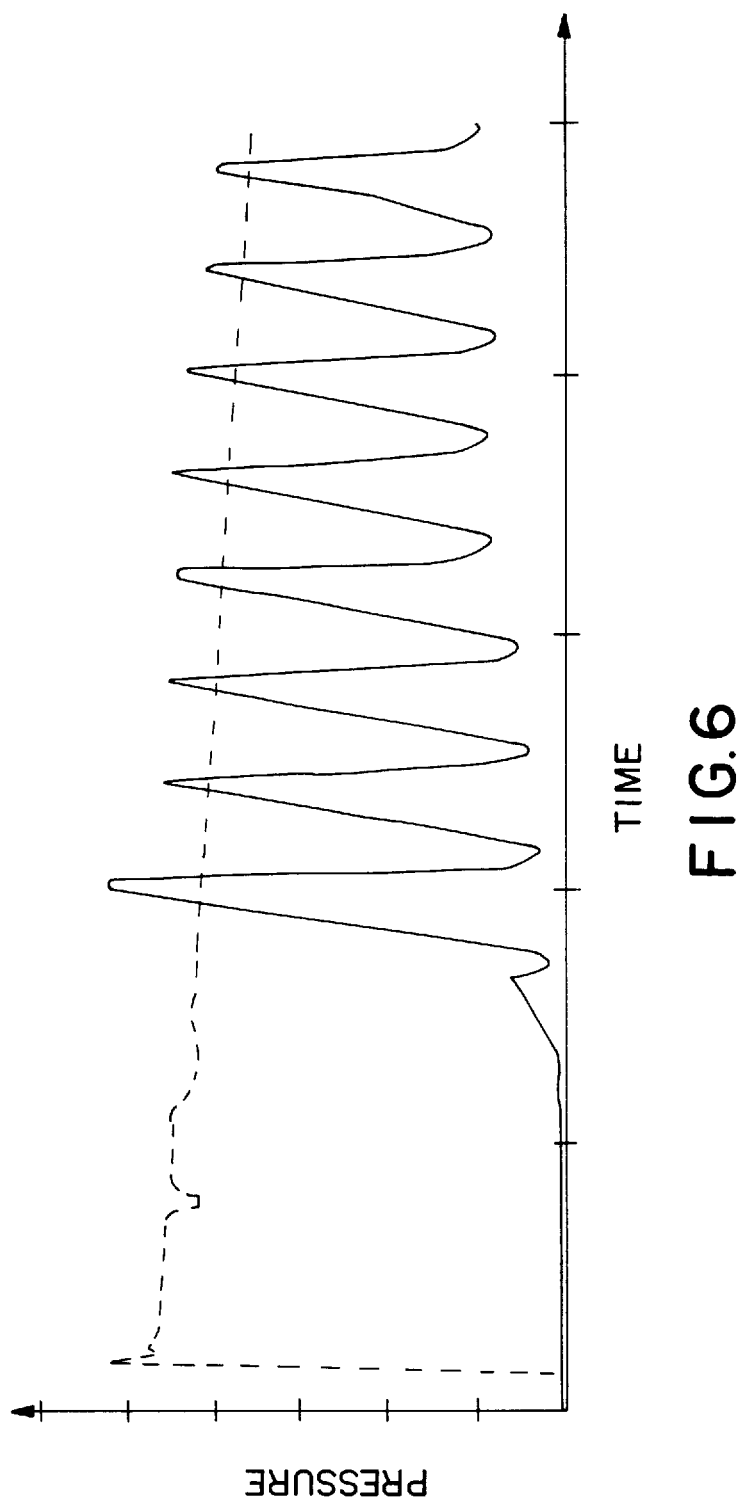
FIG. 6 is a graphical illustration of pressure profiles within a mold cavity as produced by a conventional process and the process according to the present invention.

FIG. 6 is a graphical illustration of pressure profiles within the mold cavity. The dashed line illustrates a reference pressure profile as generated by a conventional injection molding process. The solid line illustrates a pressure profile within the mold cavity 30 produced by the novel apparatus and methods according to the present invention. The molding conditions for both processes were identical except for the vibration during the process according to the present invention.

As is evident, there are major differences in the pressure profile during and after injection between the conventional process and process according to the present invention. The conventional injection molding process produces an initial rise to a peak pressure during filling which slowly decreases over time. There is no vibration of the material within the mold cavity 30 produced by the conventional method during filling. The process according to the present invention, on the other hand, initially subjects the material in the mold cavity to very low pressure during the filling stage and while the screw injector is oscillating back and forth. This low initial pressure allows the material within the mold cavity 30 to flow without subjecting the material to excessive shear stresses. The material flow within the mold cavity is one of the main factors which determine the shear stress acting on the material. For example, when the material is initially injected into the mold cavity it is in a high stress state caused by the flow through the conduits. The subsequent reduction in pressure during injection results in an initial reduction in the shear stress in the material. This helps to reduce the birefringence in the part in the case of amorphous materials.

As illustrated, the reciprocation of the screw is controlled so that at least a portion of the pressure profile within the mold cavity 30 has a substantially constant low stress followed by a portion of the pressure profile which includes a series of high and low pressure cycles. For the oscillating portion of the pressure profile, preferably the low pressure for each subsequent cycle is slightly greater than the low pressure for the previous cycle for at least a segment of the oscillating pressure profile portion. The series of pressure cycles vibrates the material within the mold so as to produce a change in the resulting material properties.

As discussed above, it is preferable to axially reciprocate the screw conveyor 16 in a stepped manner (e.g., each axial reciprocation moving the screw tip $16_T$ closer to the mold 28). The predetermined axial distances ($D_1$, $D_2$, etc.) and/or locations ($L_1$, $L_2$, etc.) can vary either linearly or non-linearly. For example, each reciprocation may translate the screw conveyor 16 one half inch closer to the mold 28 (i.e., $D_1$=0.5 inches, $D_2$=1 inch, $D_3$=1.5 inches). Alternately, the translation of the screw conveyor 16 may be non-linear (e.g., $D_1$ =0.5 inches, $D_2$ =1.25 inches, $D_3$ =1.7 inches). The size of the shot will have a significant effect on the predetermined axial distances chosen.

It is also contemplated that it may be desirable to control the reciprocation of the screw conveyor in a periodic manner (i.e., conveyance-reciprocation-conveyance), either linearly or non-linearly. For example, the screw conveyor 16 may be reciprocated after each ten percent of mold cavity fill. Alternately, the screw conveyor 16 may be reciprocated according to a functional relationship based on the amount of material in the mold cavity, e.g., as the amount of material in the mold cavity increases, the amount of conveyance time between reciprocations decreases and/or the length of reciprocation increases. It may, instead, be desirable to continuously reciprocate the screw conveyor 16. That is, the conveyance (rotation of the screw conveyor 16) and the reciprocation occur simultaneously. Those skilled in the art of injection molding can readily appreciate the various alternate combinations of reciprocation and conveyance that can be practiced within the scope of this invention.

In yet a further embodiment, a pressure sensor can be mounted within the mold cavity for monitoring the resulting pressure. A pressure signal can be sent to the controller for controlling the actuation of the screw conveyor 16 according to predetermined schedule which corresponds to a desired pressure profile within the mold cavity.

Figure 5:
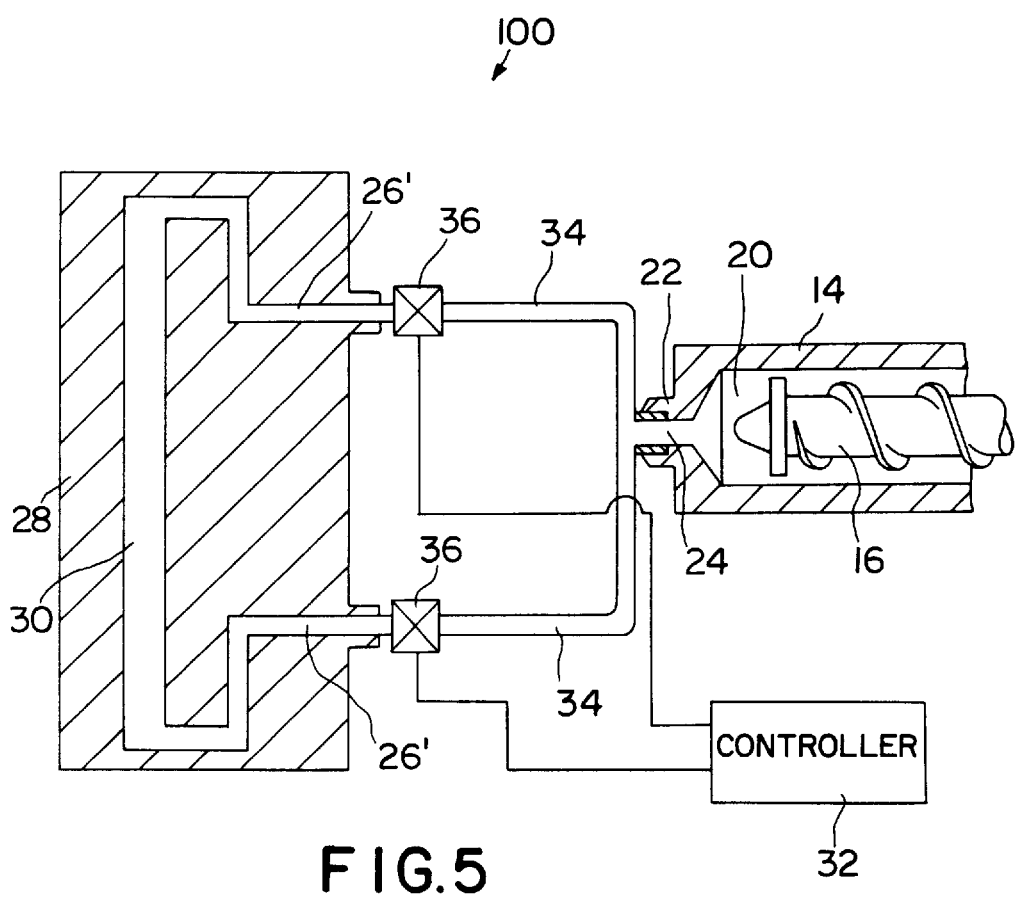
FIG. 5 illustrates an alternate embodiment of the injection molding apparatus according to the present invention.

FIG. 5 illustrates an alternate embodiment for producing flow and shearing of the molten material within a mold cavity 30. In this embodiment, the screw conveyor 16 conveys the molten material within the barrel 14 to the nozzle 22. After the molten material passes through the passageway 24 in the nozzle 22, the molten material is channeled along two or more conduits 34. Each conduit 34 is in communication with the mold cavity 30. The conduits 34 communicate with the mold cavity 34 at spaced apart locations. Between at least one conduit 34 and the nozzle 22 is a flow control valve 36, such as a valve gate. Actuation of the flow control valve 36 controls the flow of the molten material into and out of the mold 28. The controller 32 is preferably utilized to control actuation of the flow control valve 36 between an open position and a closed position. In the embodiment illustrated, there are a plurality of flow control valves 36, one flow control valve 36 located between each conduit 34 and the nozzle 22.

During operation of the illustrated embodiment, the flow control valves 36 and screw conveyor 16 are controlled so as to produce the desired flowing and/or shearing of the material within the mold cavity 30. For example, after a sufficient amount of molten material is accrued within the accumulation chamber 20, the controller 32 closes the first flow control valve 36 thereby permitting flow into the mold cavity 30 through the second valve 36 and along its associated conduit 34. The controller 32 then sends signals to cause the screw conveyor 16 to reciprocate and, thus, drive the material into the mold cavity 30. The screw conveyor 16 is then reciprocated away from the mold 28 and the controller 32 closes the second valve 36 and opens the first valve 36. The screw conveyor 16 is again driven toward the mold 28 causing material to flow along the conduit 34 associated with the first valve 36. This process is continued until the desired amount of shearing of the material within the mold cavity 30 has occurred and/or the product has solidified.

It is also contemplated that the actuation of the flow control valves can be performed during the filling phase as discussed above with respect to the oscillating screw injector. For example, after a sufficient amount of material is within the accumulation chamber 20, the first valve 36 is opened and the second valve 36 is closed. The screw conveyor 16 is then moved toward the mold cavity a predetermined distance injecting a portion of the material. The first valve 36 is then closed and the second valve 36 opened. The screw conveyor 16 is then moved away from the mold 28 causing material flow within the mold cavity 30. The screw conveyor 16 is then moved toward the mold 28 a second predetermined distance causing additional material to flow into the mold cavity 30 through the second conduit 34. These steps are repeated until the entire mold cavity 30 is filled, at which point further reciprocation of the screw conveyor 16 and actuation of the flow control valves 36 can be controlled to provide the control of the shearing.

As should be apparent from the above discussion, the opening and closing of the valves 36, in combination with the oscillation of the screw conveyor 16, causes the material within the mold cavity 30 to flow back and forth. This produces a shearing of the material within the mold. The shearing results in macromolecular orientation of the melt in the direction of flow. The shearing of the material also assists in removing entrapped air from within the melt, thereby reducing or eliminating the occurrence of weld/knit lines and micro-voids. This also achieves many of the benefits discussed above, such as additional mixing of the material, relaxation of residual stresses, and transformation of the physical properties of the material.

It may be desirable at predetermined points during the injection process to open both valves 36. For example, after the mold cavity 30 has been filled, it may be desirable to open both valves 36 to allow the reciprocation of the screw conveyor to cause compression and relaxation of the material within the mold 28.

The above discussion has centered around reciprocation of the screw conveyor. However, it is also contemplated that the injection unit which is reciprocated may instead be a plunger. The plunger is translated along its longitudinal axis as it injects material into the mold cavity in a similar manner as described above (i.e., first and second predetermined distances). The overall result is the movement of the plunger closer toward the mold with each reciprocation.

Although the invention has been described and illustrated with respect to the exemplary embodiments thereof, it should be understood by those skilled in the art that the foregoing and various other changes, omissions and additions may be made therein and thereto, without parting from the spirit and scope of the present invention.

We claim:

1. A method for applying an oscillating force on a molten material within a mold cavity comprising the steps of:

dispensing a moldable material into an barrel, rotating a screw conveyor about its longitudinal axis for conveying the moldable material to an accumulation chamber;

accumulating a predetermined amount of material within the accumulation chamber;

translating the screw conveyor along its longitudinal axis and toward a mold a first predetermined distance to a first location so as to force a portion of the accumulated material to flow along a conduit and into a mold cavity;

translating the screw conveyor along its longitudinal axis away from the mold; and translating the screw conveyor along its longitudinal axis and toward the mold a second predetermined distance to a second location forcing accumulated material to flow along the conduit and into the mold cavity, the second location being closer to the mold than the first location.

2. A method for applying an oscillating force on a molten material according to claim 1 further comprising the step of actuating a flow control valve between axial translations of the screw conveyor, the flow control valve controlling the flow of the moldable material into and within the mold cavity.

3. A method for applying an oscillating force on a molten material according to claim 1 further comprising the steps of:

actuating a first flow control valve between an open and closed position, the first flow control valve controlling flow of the molten material along a first conduit in communication with the mold cavity; and actuating a second flow control valve between an open and closed position, the second flow control valve controlling flow of the molten material along a second conduit in communication with the mold cavity;

wherein the actuation of the flow control valves is performed between axial translations of the screw conveyor and is controlled by a controller, the actuation of the flow control valves and the translations of the screw conveyor producing a flow of the material in a prescribed direction within the mold cavity.

4. A method for applying an oscillating force on a molten material according to claim 1 wherein the moldable material dispensed into the barrel comprises at least two constituent parts.

5. A method for applying an oscillating force on a molten material according to claim 3 wherein the flow control valves are valve gates which are actuatable for preventing flow along a conduit into the mold cavity.

6. A method for applying an oscillating force on a molten material according to claim 3 wherein the controller controls actuation of the first and second flow control valves so that the first flow control valve is in its open position when the second control valve is in its closed position.

7. A method for applying an oscillating force on a molten material according to claim 3 further comprising the steps of:

actuating the first and second flow control valves into their open position and reciprocating the screw conveyor so as to produce holding pressure on the material within the mold cavity; actuating the first and second flow control valves into their closed position; and solidifying the material within the mold cavity.

8. A method for applying an oscillating force on a molten material according to claim 1 further comprising the steps of:

providing a signal indicative of the position of the screw conveyor within the barrel; and controlling the translation of the screw conveyor based on the signal.

9. A method for applying an oscillating force on a molten material according to claim 8 wherein the signal is a position signal.

10. A method for applying an oscillating force on a molten material according to claim 8 wherein the signal is a time signal.

11. A method for applying an oscillating force on a molten material according to claim 1 further comprising the steps of:

sensing a pressure within the mold cavity and providing a signal indicative thereof;

comparing the sensed pressure signal to a predetermined schedule indicative of a desired pressure profile within the mold cavity; and controlling the translation of the screw conveyor based on the comparison.

12. A method for applying an oscillating force on a molten material within a mold cavity comprising the steps of:

dispensing a moldable material into an barrel, rotating a screw conveyor about its longitudinal axis for conveying the moldable material to an accumulation chamber;

accumulating a predetermined amount of material within the accumulation chamber; and oscillating the screw conveyor back and forth along its longitudinal axis to force the accumulated material to flow back and forth along a conduit and in a mold cavity, the oscillatory motion controlling an amount of shearing of the material within the mold cavity, wherein the screw conveyor is translated closer toward the mold cavity with each oscillation.

13. A method for applying an oscillating force on a molten material according to claim 12 further comprising the steps of:

providing a signal indicative of the position of the screw conveyor within the barrel; and controlling the translation of the screw conveyor based on the signal.

14. A method for applying an oscillating force on a molten material according to claim 13 wherein the signal is a position signal.

15. A method for applying an oscillating force on a molten material according to claim 13 wherein the signal is a time signal.

16. A method for applying an oscillating force on a molten material according to claim 12 further comprising the steps of:

sensing a pressure within the mold cavity and providing a signal indicative thereof;

comparing the sensed pressure signal to a predetermined schedule indicative of a desired pressure profile within the mold cavity; and controlling the translation of the screw conveyor based on the comparison.

17. A method for applying an oscillating force on a molten material according to claim 12 further comprising the steps of:

actuating a first flow control valve between an open and closed position, the first flow control valve controlling flow of the molten material along a first conduit in communication with the mold cavity; and actuating a second flow control valve between an open and closed position, the second flow control valve controlling flow of the molten material along a second conduit in communication with the mold cavity;

wherein the actuation of the flow control valves is performed during the oscillation of the screw conveyor and is controlled by a controller, the actuation of the flow control valves and oscillation of the screw conveyor producing a flow of the material in a prescribed direction within the mold cavity.

18. A method for applying an oscillating force on a molten material according to claim 12 wherein the moldable material dispensed into the barrel comprises at least two constituent parts.

19. A method for applying an oscillating force on a molten material according to claim 17 wherein the flow control valves are valve gates which are actuatable for preventing flow along a conduit into the mold cavity.

20. A method for applying an oscillating force on a molten material according to claim 17 wherein the controller controls actuation of the first and second flow control valves so that the first flow control valve is in its open position when the second control valve is in its closed position.

21. A method for applying an oscillating force on a molten material according to claim 17 further comprising the steps of:

actuating the first and second flow control valves into their open position and reciprocating the screw conveyor so as to produce holding pressure on the material within the mold cavity;

actuating the first and second flow control valves into their closed position; and solidifying the material within the mold cavity.

22. A method for applying an oscillating force on a molten material within a mold cavity comprising the steps of:

dispensing a moldable material into an barrel, rotating a screw conveyor about its longitudinal axis for conveying the moldable material to an accumulation chamber;

accumulating a predetermined amount of material within the accumulation chamber; and oscillating the screw conveyor back and forth along its longitudinal axis to force the accumulated material to flow back and forth along a conduit and in a mold cavity, the oscillatory motion subjecting the material within the mold cavity to a prescribed pressure profile, at least a portion of the prescribed pressure profile having a substantially constant low pressure.

23. A method for applying an oscillating force according to claim 22 wherein at least a portion of the pressure profile oscillates between upper and lower pressures with each subsequent lower pressure being slightly larger than the previous lower pressure for the portion.

24. A method for applying an oscillating force on a molten material within a mold cavity comprising the steps of:

dispensing a moldable material into an barrel, rotating a screw conveyor about its longitudinal axis for conveying the moldable material to an accumulation chamber;

accumulating a predetermined amount of material within the accumulation chamber;

maintaining a first flow control valve in a closed position so as to prevent flow of molten material along a first conduit in communication with the mold cavity;

actuating a second flow control valve into an open position so as to allow flow of molten material along a second conduit in communication with the mold cavity;

translating the screw conveyor along its longitudinal axis and toward a mold so as to force a portion of the accumulated material to flow along the second conduit and into a mold cavity;

translating the screw conveyor along its longitudinal axis away from the mold;

actuating the second flow control valve into a closed position so as to prevent flow of molten material along the second conduit;

actuating the first flow control valve into an open position so as to allow flow of molten material along the first conduit; and translating the screw conveyor along its longitudinal axis and toward the mold forcing accumulated material to flow along the conduit and into the mold cavity.

25. An injection molding apparatus for applying an oscillating force to a molten material, comprising:

a hopper for storing and dispensing moldable material;

a barrel in communication with the hopper for receiving a flow of moldable material, the barrel having a screw conveyor rotatably mounted therein, the screw conveyor also being axially reciprocatable within the barrel, the screw conveyor having at least one conveyor flight formed thereon for conveying and compressing the moldable material within the barrel;

a nozzle formed on the barrel at a location downstream from the screw conveyor, the nozzle having a passageway formed therethrough which permits flow of material out of the barrel, the screw conveyor forcing the material to flow through the passageway;

a mold assembly having at least one conduit in communication with the passageway in the nozzle, the conduit also being in communication with a mold cavity which defines the shape of the final product; and a controller for controlling the rotation and reciprocation of the screw conveyor within the barrel, the controller producing rotation of the screw conveyor for conveying the material toward the mold cavity, the controller reciprocating the screw conveyor along its longitudinal axis toward and away from the mold cavity during the filling of the mold cavity for controlling the amount of shearing of the material, each reciprocation of the screw conveyor translating the conveyor closer toward the mold cavity.

26. An injection molding apparatus according to claim 25 further comprising a sensor for providing a position signal indicative of the axial position of the screw, the controller receiving the position signal and controlling the screw conveyor in accordance therewith.

27. An injection molding apparatus according to claim 25 further comprising means for determining a process time signal, the controller determining the position of the screw based on the process time signal and controlling the screw conveyor in accordance therewith.

28. An injection molding apparatus according to claim 25 wherein the controller determines when a predetermined amount of material has been conveyed, the controller then moves the screw conveyor to a first axial position injecting a portion of the material into the mold cavity, the controller then moves the screw conveyor away from the mold to a retracted position after which the controller moves the screw conveyor toward the mold to a second position, wherein the second position is closer to the mold than the first position.

29. An injection molding apparatus according to claim 25 wherein the mold assembly has a plurality of conduits in communication with the passageway in the nozzle, each conduit communicating with a spaced apart location of the mold cavity; the apparatus further comprising at least one flow control valve between one of the conduits and the nozzle, the valve actuatable between an open position for permitting flow of the moldable material along the conduit and a closed position inhibiting flow of the moldable material along the conduit; and wherein the controller controls actuation of the valve, the controller actuating the valve between the closed and open position during reciprocated of the screw conveyor so as to cause a flowing of the material within the mold cavity.

30. An injection molding apparatus according to claim 29 wherein there are a plurality of flow control valves, one valve between each conduit and the nozzle, each valve actuatable between an open position for permitting flow of the moldable material along its associated conduit and a closed position inhibiting flow of the moldable material along its associated conduit; and wherein the controller controls actuation of the valves so as to simultaneously cause at least one valve to be in its open position and at least another valve to be in its closed position while the screw conveyor is being reciprocated.

31. An injection molding apparatus according to claim 30 wherein the flow control valves are valve gates.

32. An injection molding apparatus according to claim 26 wherein the control of screw conveyor is performed according to a predetermined schedule for producing a desired pressure profile on the material within the mold cavity.

33. An injection molding apparatus, according to claim 32 wherein at least a portion of the desired pressure profile on the material within the mold cavity oscillates between high and low pressures on the material for a prescribed time period.

* * * * *